US010643415B2

(12) United States Patent
Fee et al.

(10) Patent No.: US 10,643,415 B2
(45) Date of Patent: May 5, 2020

(54) PACKAGE MANAGEMENT SYSTEM WITH ACCELERATED DELIVERY

(71) Applicant: Florence Corporation, Manhattan, KS (US)

(72) Inventors: Kevin A. Fee, Manhattan, KS (US); Zachary A. Williams, Burrton, KS (US)

(73) Assignee: Florence Corporation, Manhattan, KS (US)

( * ) Notice: Subject to any disclaimer, the term of this patent is extended or adjusted under 35 U.S.C. 154(b) by 0 days.

(21) Appl. No.: 16/161,405

(22) Filed: Oct. 16, 2018

(65) Prior Publication Data

US 2019/0114859 A1    Apr. 18, 2019

Related U.S. Application Data

(60) Provisional application No. 62/572,965, filed on Oct. 16, 2017.

(51) Int. Cl.
| | | |
|---|---|---|
| *G07C 9/00* | (2020.01) | |
| *G06K 7/14* | (2006.01) | |
| *G07F 17/12* | (2006.01) | |
| *G06Q 10/08* | (2012.01) | |

(52) U.S. Cl.
CPC ....... *G07C 9/00912* (2013.01); *G06K 7/1417* (2013.01); *G06Q 10/0836* (2013.01); *G07F 17/12* (2013.01)

(58) Field of Classification Search
None
See application file for complete search history.

(56) References Cited

U.S. PATENT DOCUMENTS

| | | | |
|---|---|---|---|
| 5,385,265 A | 1/1995 | Schlamp | |
| 6,456,981 B1 | 9/2002 | Dejaeger et al. | |
| 7,099,038 B2 | 8/2006 | Schuller | |
| 8,589,310 B2 | 11/2013 | Mayer et al. | |
| 9,082,247 B2 | 7/2015 | Turner et al. | |
| 9,223,315 B2* | 12/2015 | Irwin | G05D 3/00 |
| 9,547,962 B2* | 1/2017 | Motoyama | G06Q 10/04 |
| 9,604,258 B2 | 3/2017 | Layne et al. | |

(Continued)

FOREIGN PATENT DOCUMENTS

WO    WO 2017/163018 A2    9/2017

*Primary Examiner* — K. Wong
(74) *Attorney, Agent, or Firm* — Leydig, Voit & Mayer, Ltd.

(57) ABSTRACT

The disclosure provides a system for delivering packages by a delivery person in a location with multiple recipients comprising a plurality of lockers, each locker having an interior space, a door, a locker identifier, and a locking portion associated with each door. A central control unit comprises a first input device configured to allow the delivery person to designate the number of lockers to be opened, a second input device adapted to read the package identifier and a locker identifier, and a controller configured to deactivate the locking portions on the designated lockers. Upon delivery, the controller deactivates the number of locking portions equal to the number of designated lockers, and at a location remote from the central control unit, the second input device reads a package and a locker identifier for a designated locker and transmits the package and locker information to the central control unit.

16 Claims, 9 Drawing Sheets

(56) References Cited

U.S. PATENT DOCUMENTS

| | | |
|---|---|---|
| 9,715,780 B2 | 7/2017 | Garrison |
| 2002/0035515 A1 | 3/2002 | Moreno |
| 2002/0054370 A1* | 5/2002 | Hara .................. H04N 1/00 358/436 |
| 2002/0130172 A1 | 9/2002 | Hara |
| 2002/0177922 A1 | 11/2002 | Bloom |
| 2003/0025590 A1 | 2/2003 | Gokcebay et al. |
| 2003/0195696 A1 | 10/2003 | Jones |
| 2007/0296579 A1 | 12/2007 | Mayer et al. |
| 2010/0057580 A1 | 3/2010 | Raghunathan |
| 2010/0197293 A1 | 8/2010 | Shem-Tov |
| 2010/0203831 A1 | 8/2010 | Muth |
| 2011/0125664 A1 | 5/2011 | Kadaba |
| 2011/0144798 A1 | 6/2011 | Freudelsperger |
| 2012/0130916 A1 | 5/2012 | Neal et al. |
| 2012/0194043 A1 | 8/2012 | Turner et al. |
| 2012/0306617 A1 | 12/2012 | Tung |
| 2013/0144428 A1 | 6/2013 | Irwin et al. |
| 2013/0159194 A1 | 6/2013 | Habib |
| 2013/0261792 A1 | 10/2013 | Gupta et al. |
| 2013/0307382 A1 | 11/2013 | Garrison |
| 2013/0337890 A1 | 12/2013 | Earley et al. |
| 2013/0338822 A1 | 12/2013 | Gibson, Jr. et al. |
| 2014/0114875 A1 | 4/2014 | Murthy et al. |
| 2014/0120901 A1 | 5/2014 | Ward et al. |
| 2014/0279666 A1 | 9/2014 | Lievens et al. |
| 2014/0330603 A1 | 11/2014 | Corder et al. |
| 2014/0373184 A1 | 12/2014 | Mahaffey et al. |
| 2015/0081583 A1 | 3/2015 | Butler et al. |
| 2015/0091693 A1 | 4/2015 | Bibeau et al. |
| 2015/0120601 A1* | 4/2015 | Fee .................. G06Q 10/0836 705/339 |
| 2015/0133051 A1 | 5/2015 | Jamal-Syed et al. |
| 2015/0186840 A1* | 7/2015 | Torres .................. A47B 81/00 705/339 |
| 2015/0356801 A1 | 12/2015 | Nitu et al. |
| 2018/0033235 A1 | 2/2018 | Dotterweich et al. |

* cited by examiner

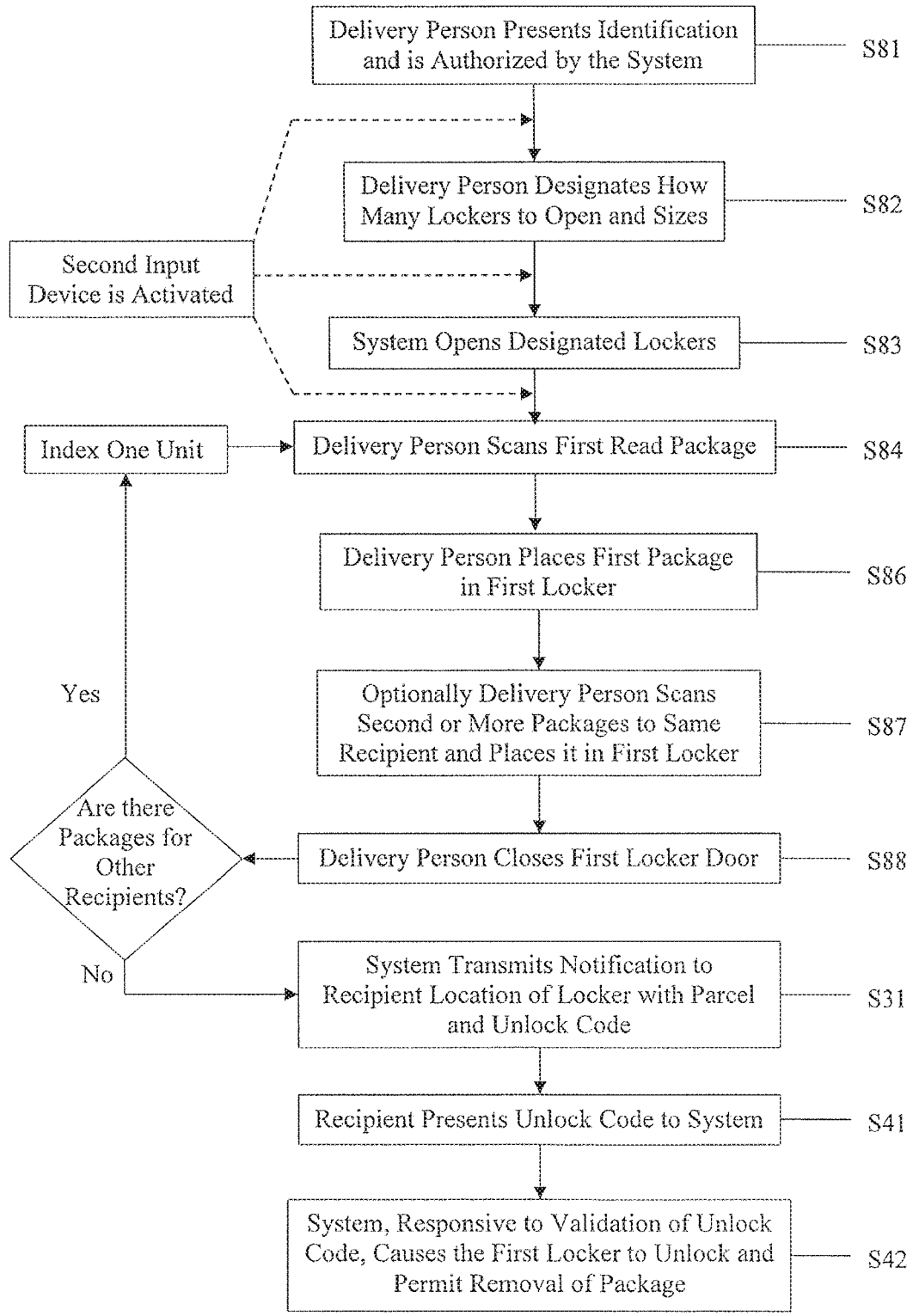

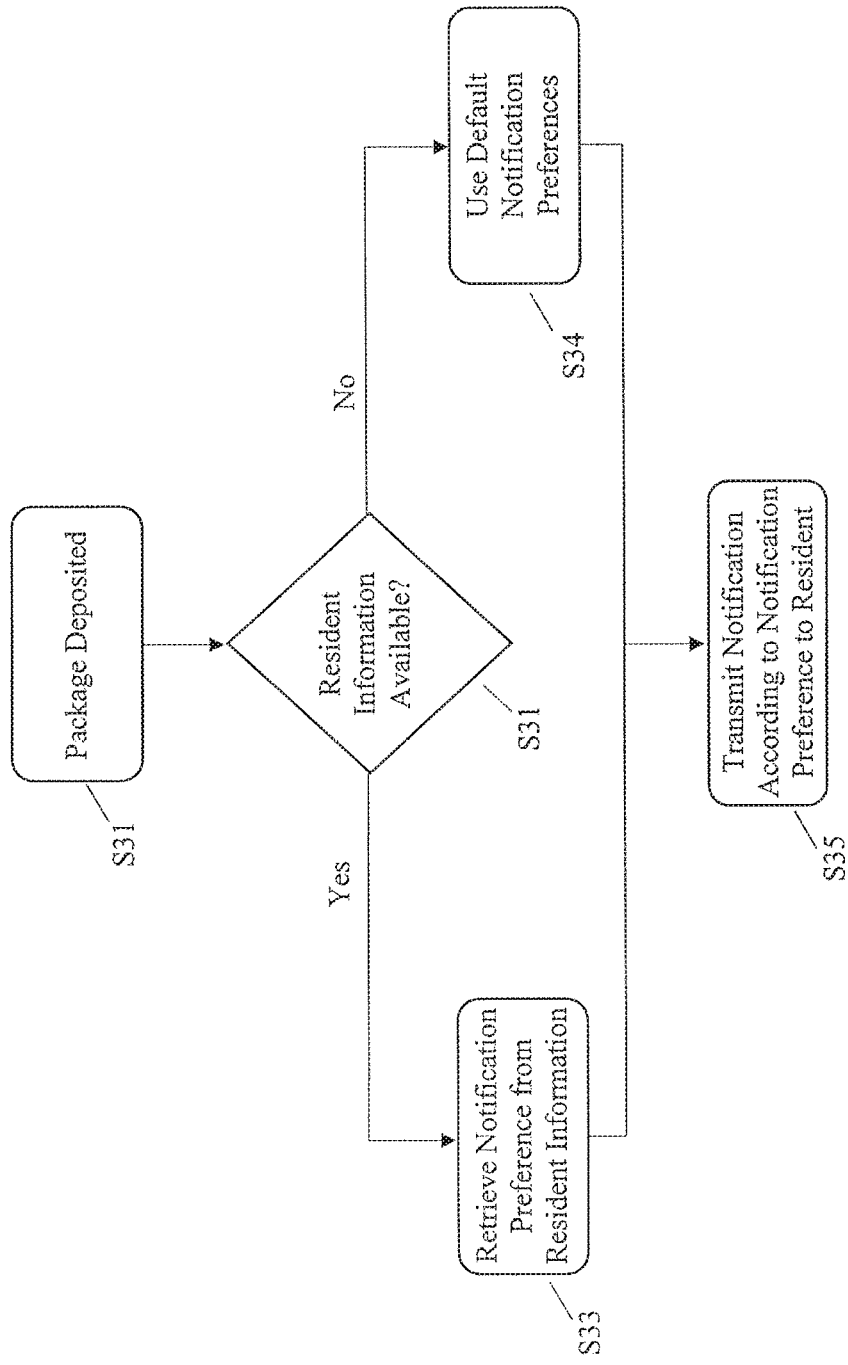

PACKAGE MANAGEMENT SYSTEM WITH ACCELERATED DELIVERY

CROSS-REFERENCE TO RELATED APPLICATIONS

This application claims benefit of U.S. Provisional Application 62/572,965, filed Oct. 16, 2017, which is incorporated by reference herein in its entirety for all purposes.

TECHNICAL FIELD

The present disclosure relates to a system and method for managing packages and other items that provides efficiencies for an authorized user of the system.

BACKGROUND

Consumers have fully embraced online shopping and are spending increasing amounts with online retailers. Some online retailers have used increasing economies of scale to help reduce the costs of shipping purchases to the consumer. Other online retailers have optimized their logistics to reduce the time between an order being placed by a consumer and the delivery of the order to the consumer. Traditional brick-and-mortar retailers have also embraced this shift in consumer demand and introduced online storefronts, along with incentives encouraging consumers to make purchases online. Accordingly, an increasing number of packages are being shipped to consumers and a resident is receiving multiple packages in a single day.

Many of the consumers embracing online shopping reside in multiple household properties. These can include student housing, apartment complexes, and condominiums. These residents are often times not available during the day when packages are delivered. In some multiple household properties, the shipper simply places the package in a designated location that can optionally be secured. This presents the possibility of the packages being stolen before the resident can retrieve the package. Although some multiple household properties have a front desk or reception area that is staffed, receiving shipments on behalf of the residents distracts the staff from their other duties. In some multiple resident housing environments, such as student housing, it may be desirable for employees of the residence hall to place packages in the lockers rather than have a carrier spend the time making the deposit in a locker. Thus, as used herein, the term delivery person or system provider may also include employees of the residence hall or apartment building.

Shippers and multiple household properties have initially developed solutions that allow for a shipper to securely deposit a package or other item for a resident. The resident can then, at a later time, retrieve the package using an identifier. Such a solution helps reduce losses for the shipper, helps reduce the workload on the staff at the property, and provides an amenity for residents who will know their packages are secure even when they are not at their residence to receive the packages. However, the current solutions are often cumbersome and difficult to use by the delivery person especially when he has many packages or multiple packages for a single resident, requiring him or her to spend extra time in the delivery process.

The system described here helps address these and other problems and provides an efficient means for delivering items by a service provider or delivery person and a secure means of receiving items on behalf of the system's users.

SUMMARY OF THE DISCLOSURE

One aspect of the disclosure is a system that provides the system's users the ability to securely receive items. The system provides a secure location for multiple items to be efficiently deposited by a service provider to residents or recipients at a location when packages are being delivered by a shipper or service provider. The system's recipients can retrieve the items from the system later. The items are securely stored after being deposited because only authorized individuals have access to the items after a service provider has deposited the items.

Another aspect of the disclosure provides a system for delivering packages in a location with multiple residents or recipients by a delivery person, with each package having a package identifier that includes recipient information, comprising a plurality of lockers, each locker having an interior space and a door that when opened allows access to the interior space and a locker identifier, a locking portion associated with each door for allowing the door to open when in the unlocked state and remain closed when in the locked state, a central control unit comprising an authentication portion adapted to verify the status of the delivery person, a first input device configured to allow the delivery person to designate the number of lockers to be opened, a second input device adapted to read the package identifier and a controller configured to deactivate the locking portions on the designated lockers and an output device to provide notice to a recipient, wherein upon authentication of the delivery person and identification of the number of designated lockers by the delivery person, the controller deactivates the number of locking portions equal to the number of designated lockers, and wherein, at a location remote from the central control unit, the second input device reads the package identifier of a package and a locker identifier for a designated locker, and the delivery person places the read package in the interior space of the read locker and closes the associated door, and the output device notifies the recipient of the receipt of a package.

In another aspect of the disclosure, two or more packages can be placed in the same locker if they are addressed to one recipient. In this aspect, that recipient is notified that they have received more than one package.

In another aspect of the disclosure, the second input device is a handheld bar code reader, which may be the hand held reader generally carried by the delivery person.

In another aspect of the disclosure, the system provides for delivering packages in a location with multiple recipients by a delivery person, with each package having a package identifier that includes recipient information, comprising, a plurality of lockers, each locker having an interior space and a door that when opened allows access to the interior space, a locking portion associated with each door for allowing the door to open when in the unlocked state and remain closed when in the locked state and adapted to receive instruction from the central control unit to change from the locked state to the unlocked state and send information to the central control unit when the door is manually closed and the lock is changed to the locked state, a central control unit comprising an authentication portion adapted to verify the status of the delivery person, a first input device configured to allow the delivery person to designate the number of lockers to be opened, a second input device adapted to read the package identifier, a controller configured to deactivate the locking portions on the designated lockers, and an output device to provide notification to a recipient, wherein upon authentication of the delivery person and identification of the number of designated lockers by the delivery person, the controller deactivates the number of locking portions equal to the number of designated lockers, and wherein, the delivery person reads the package and places the read package in the interior space of one designated locker and closes the associated door, and wherein the central control unit associates the package, locker and recipient and the output device notifies the recipient of the delivery of a package.

Further and alternative aspects and features of the disclosed principles will be appreciated from the following detailed description and the accompanying drawings. As will be appreciated, the principles disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 8 illustrates steps for when a delivery person deposits a package with another embodiment of the package management system.

FIG. 9 illustrates steps for notifying the resident that a package has been deposited with one embodiment of the package management system.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. The terms configured and configuration may be used herein to refer to a specified arrangement, or a structural size and shape.

Figure 1:
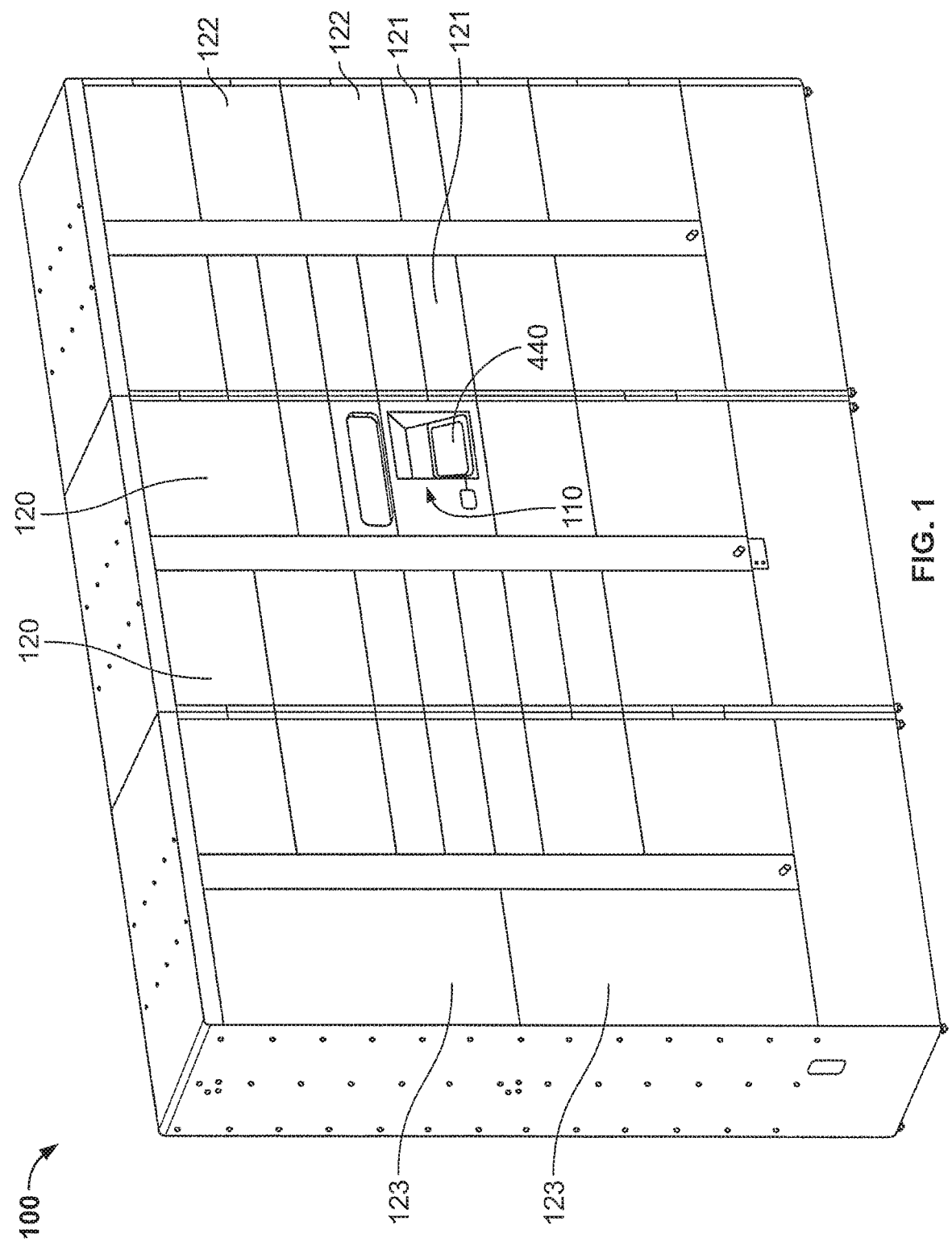
FIG. 1 illustrates an installed embodiment of the package management system.

FIG. 1 illustrates one embodiment of the system 100 that allows for the system's user to securely receive items. Although the system 100 is described as a package management system in this specification, those of ordinary skill will recognize the benefits that will arise from employing this system in other areas beyond packages for residents. For example, tenants of coworking spaces can also benefit from this system. Further, the items need not be packages deposited by a shipper and can include other items such as clothing that has been dry-cleaned, notices from property management, and food from food delivery services.

Figure 2:
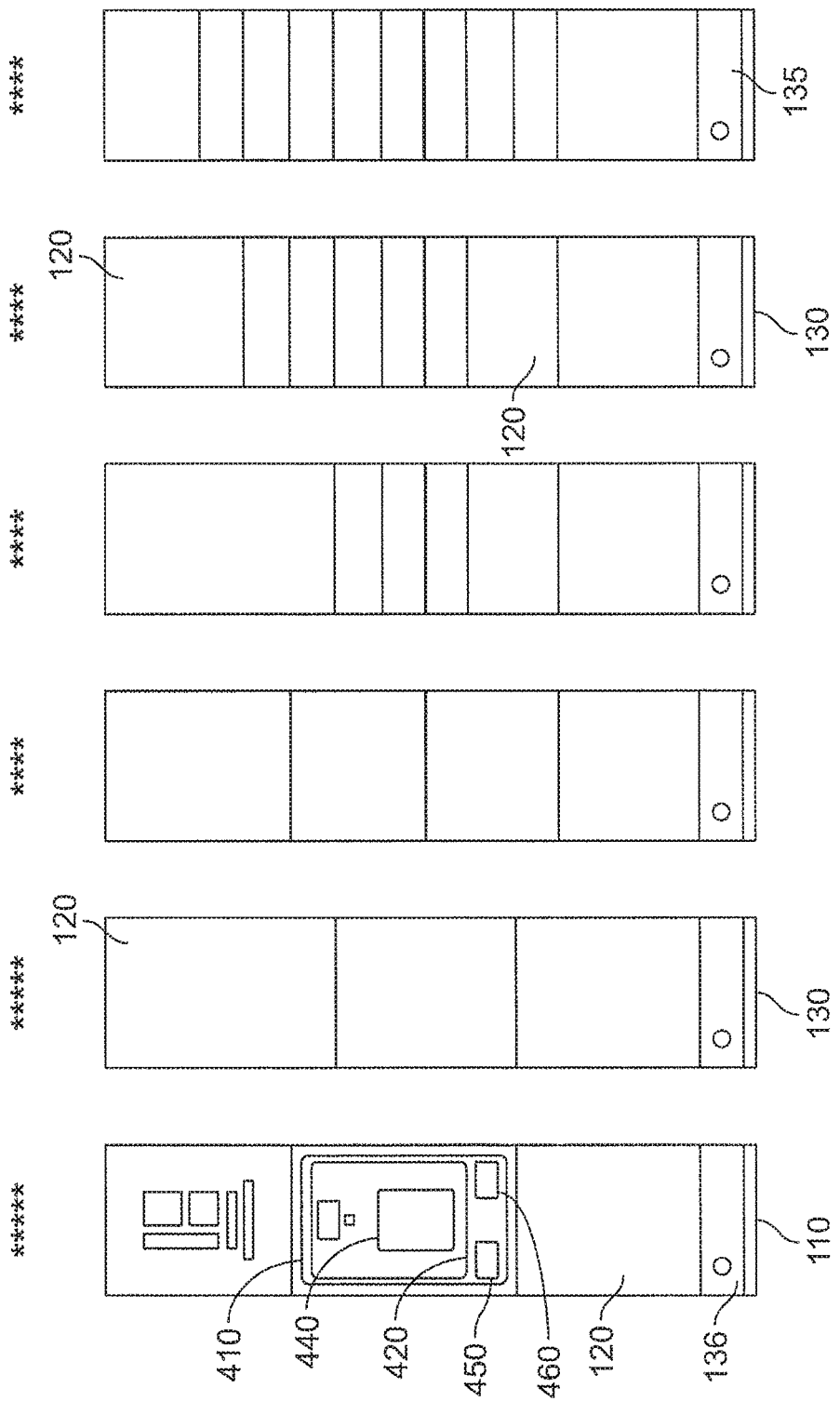
FIG. 2 illustrates an embodiment of the central control unit, storage locker module, and a variety of storage lockers.
Figure 3:
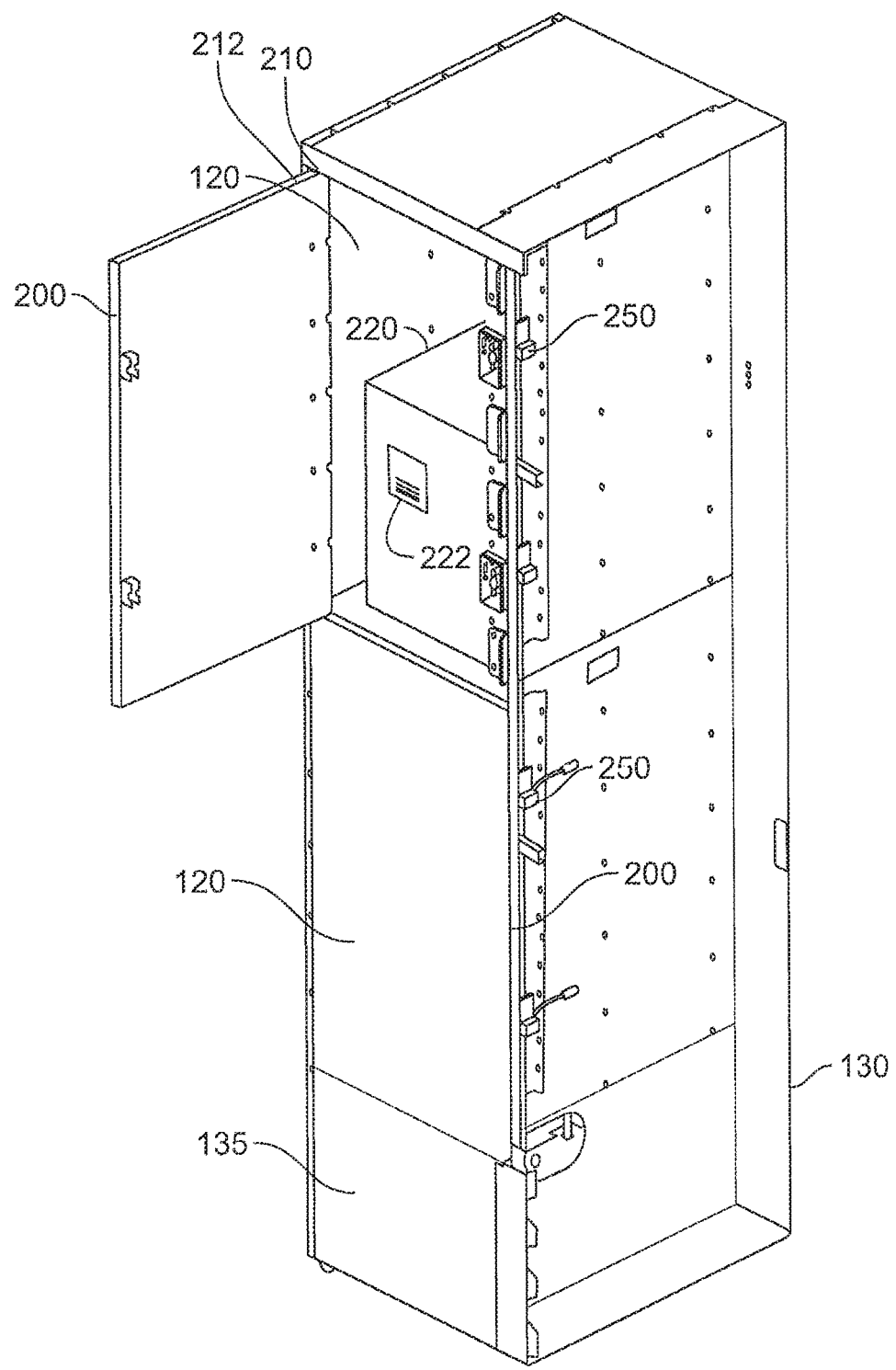
FIG. 3 illustrates one embodiment of a storage locker module with one locker having a package inside, a hinged door and a locking portion.

The system includes a central control unit 110 and a plurality of storage lockers 120. In the embodiments shown in FIGS. 1 and 2, the plurality of storage lockers 120 can be arranged in a set of storage locker modules 130. In one embodiment, a storage locker module 130 comprises a plurality of storage lockers 120 stacked vertically. Multiple storage locker modules 130 are arranged with the central control unit 110 to form the package management system 100. With a large number of modules 130 and only one central control unit 110 some of the modules 130 and lockers 120 may be located at a long distance from the central control unit 110 making it time consuming for a service provider or delivery person to deliver packages if he has to be in close proximity to the central control unit 110 for it to read each package. Multiple storage locker modules 130 can have storage lockers 120 of various sizes, as shown in FIGS. 1, 2 and 3. The central control unit 110 controls each of the storage lockers 120 of the storage locker modules 130. The central control unit 110 can also receive information from each of the storage lockers 120. The central control unit 110 can directly control at least the locking portion for each of the storage lockers 120. Individuals interact with the central control unit 110 of the system 100 to, for example, deposit and remove items. In one embodiment, the central control unit also includes a locker 125 adapted to store a portable hand held scanning device such as a bar code reader 450. The central control unit 110 allows opening of the locker 125 and access to the bar code reader only to authorized shippers or delivery persons. In another embodiment, the hand held scanner may be stored on a holder, preferably in a locked condition that can only be unlocked by qualified users.

Storage Lockers

Each of the storage lockers 120 is dimensioned to have an interior volume to be suitable for receiving and storing packages, letters, and other items of various dimensions. FIG. 3 shows a locker 120 having a package 220 received in its interior space. The package has a package identifier or destination indicator 222 on one sidewall. Examples of package identifiers include printed names and addresses of recipients, bar codes and RFID tags. In a preferred embodiment, the package identifier includes package recipient information that preferably can be read electronically.

Non-limiting examples of the dimensions of the storage lockers 120 include a height of 4.8", 10.2", 15.6", 21", and 26.4", a depth of less than 24", and a width of less than 18". The dimensions of the storage lockers 120 can be derived using industry data regarding package size mixes. In one embodiment, the locker sizes may be roughly categorized as small 121, medium 122 and large 123, as shown in FIG. 1. Each storage locker 120 is made of durable materials such as high gauge steel and includes at least one door with a locking portion to help secure packages.

FIG. 3 illustrates an example of the storage locker 120 with a hinged door 200 that is attached to the structure of the respective storage locker 120. In this embodiment, the hinged door 200 opens outward so that the interior can be accessed and items can be deposited and stored inside the storage locker 120. On the inside wall of the door is a locker identifier 260, such as a locker identification tag or label. In one embodiment, the label contains a bar code that can be read by the bar code scanner 450. Other readily identifiable identification labels and tags, such as an RFID tag, or printed locker number are also contemplated. The hinged door rotates about a hinge 210 with a hinged axis. The door hinge 210 can be hardened against forced entry techniques by unauthorized individuals. The door may have an associated door position indicator 212 connected to the central control unit 110 to provide the central control unit 110 information on the state of the door as being open or closed.

Each storage locker 120 can include an individual communications connection and a power connection. These communications and power connections are adapted to connect to corresponding connections in the storage locker modules 130. Each storage locker 120 can further include processing hardware for controlling aspects of the storage locker and for processing information regarding the storage locker. Some embodiments of the storage lockers 120 can include sealing to isolate the contents of the storage lockers 120 against external factors. Some embodiments of the storage lockers 120 can be hardened against forced entry techniques by unauthorized individuals.

Storage Locker Locking Portion

FIG. 3 also illustrates the door 200 for each storage locker 120 is secured by at least one locking portion 250. The locking portion 250 secures the door 200 so that the items within the storage locker 120 are only accessible to authorized individuals. Some non-limiting examples of locking portions 250 can be latch-based locks, cam based locks, electromagnetic locks, solenoid-based locks, spring based locks, cylinder-type locks, timer-based locks, biometric locks, and other locks known in the art. In one embodiment, the locking portion is activated and locks the locker when the door is shut and unlocks the locker and biases the door open when a command is received from the central control unit. In another embodiment, the storage locker locking portion 250 is also configured to latch without locking so that the door 200 can be closed without changing the locking portion's lock state.

Each locking portion 250 receives commands from the central control unit 110. In response to the command transmitted by the central control unit 110, the locking portion 250 changes its state. For example, a locked locking portion 250 unlocks in response to the command from the central control unit 110. In one embodiment, when receiving a command from the central control unit to change state from the locked condition to the unlocked condition, the locking portion 250 also biases the door open and a door position indictor 210 transmits information to the central control unit that the door is open.

In some embodiments, the locking portion 250 can remain unlocked until it receives further commands from the central control unit 110. This is desirable to prevent premature locking of the storage locker 120. Some embodiments of the storage locker doors include locking portions 250 that automatically relock when the door is closed without additional commands from the central control unit 110. For example, the locking portion could be spring biased to the locked condition so that the storage locker is locked when the door 200 is shut by an individual and a catch on the door interacts with a latch on the locking portion. This is desirable when it is desirable to secure the storage locker 120 immediately without requesting user confirmation. In one embodiment, the door position indicator 210 transmits information to the central control unit that the door is closed as input to the central control unit 110 to change the state of the locking portion 250 to locked. Some embodiments can use a timer to change the state of the locking portion 250. In one embodiment, the locking portion 250, after assuming the unlocked state, assumes the locked state after a predetermined amount of time has elapsed.

Each locking portion 250 can transmit status information to the central control unit 110. Status information can include whether the locking portion 250 is locked or unlocked. Status information is obtained by sensors of the locking portion 250 and the door position indicator 210. In some embodiments, the processor and memory of the locking portion 250 helps control the individual locking portion 250. For example, the processor can receive a command from the central control unit 110, and the processor then transmits a different command to aspects of the locking portion 250 so that the command from the central control unit 110 is executed.

Some locking portions 250 can include additional hardware like timers, clocks, biometric sensors, and other hardware components that provide types of input for the individual locking portion. For example, the locking portion 250 can operate as a timer-based lock so that the locking portion 250 unlocks a period of time after being locked, or locks after a period of time after being unlocked. In some embodiments, the storage-locking portion 250 can implement a restriction on a change in its state for a period of time after the state is initially changed.

Portions of these hardware features can be implemented in the storage locker 120 but nevertheless control the locking portion 250. For example, storage lockers 120 can also include processors and memory available for the locking portion 250 to use when processing information for authentication.

Some embodiments can include locking portions that can be manually overridden by authorized individuals. These types of manual action overrides are available even when the control unit 110 has not instructed the locking portion 250 to be unlocked.

Storage Locker Modules

Some embodiments can arrange the storage lockers 120 in various orientations that are not specifically described here. The storage locker module 130 can include additional hardware needed to operate the system 100. For example, the storage locker module 130 can include redundant power supplies to power the system 100 should the power levels provided by the normal power source is not adequate.

Each storage locker module 130 can include identical storage lockers 120 or a variety of differently dimensioned storage lockers 120 to match expected package mixtures. FIG. 2 illustrates non-limiting examples of the storage modules 130 with a variety of storage lockers 120. The storage locker module 130 with the plurality of storage lockers 120 and the hardware specific for the storage locker module 130 can be 8' or 7' high. Other heights suitable for the installation location are contemplated and not specifically enumerated here. The storage lockers 120 can be interchangeable components that can be inserted and removed as needed. In other embodiments, the storage lockers 120 can be formed as part of the storage locker modules 130. In some installations, a package management system 100 can comprise numerous locker modules all connected to a single central control unit 110. In relatively large installations, it can be appreciated that some of the lockers 120 in some remote modules 130 can be a long distance from the central control unit 110.

Some of the hardware specific to the storage locker module 130 includes equipment to manually disengage all of the locking portions 250 for all of the storage lockers 120 in the storage locker module 130 simultaneously and/or individually. Such equipment, when included, is preferably placed behind a secured panel or door 135 so that access is only given to authorized individuals such as property managers or law enforcement. Such a secured door 135 also prevents tampering. Other hardware specific to the storage locker module 130 can include power and communications aggregators to help reduce the number of connections between the storage lockers 120 and the central control unit 110. Each storage locker module 130 can be connected to at least one control unit 110. In some embodiments, the central control unit 110 controls aspects of the storage locker module 130 and receives information regarding the storage locker module 130. For example, the central control unit 110 can control the storage locker module 130 and unlock all of the storage lockers 120 simultaneously, and the central control unit 110 can receive information regarding whether the secured panel or door 135 is open or has been tampered with. Other types of control commands and information are contemplated and not specifically enumerated here.

Each of the storage lockers 120 in the storage locker module 130 continues to be independently controlled by the central control unit 110, but can aggregate their communications with other storage lockers 120 in the storage locker module 130 so that the number of connections to the central control unit 110 is reduced. Where necessary, each storage locker module 130 will include additional hardware to facilitate this aggregation.

Central Control Unit

Figure 4:
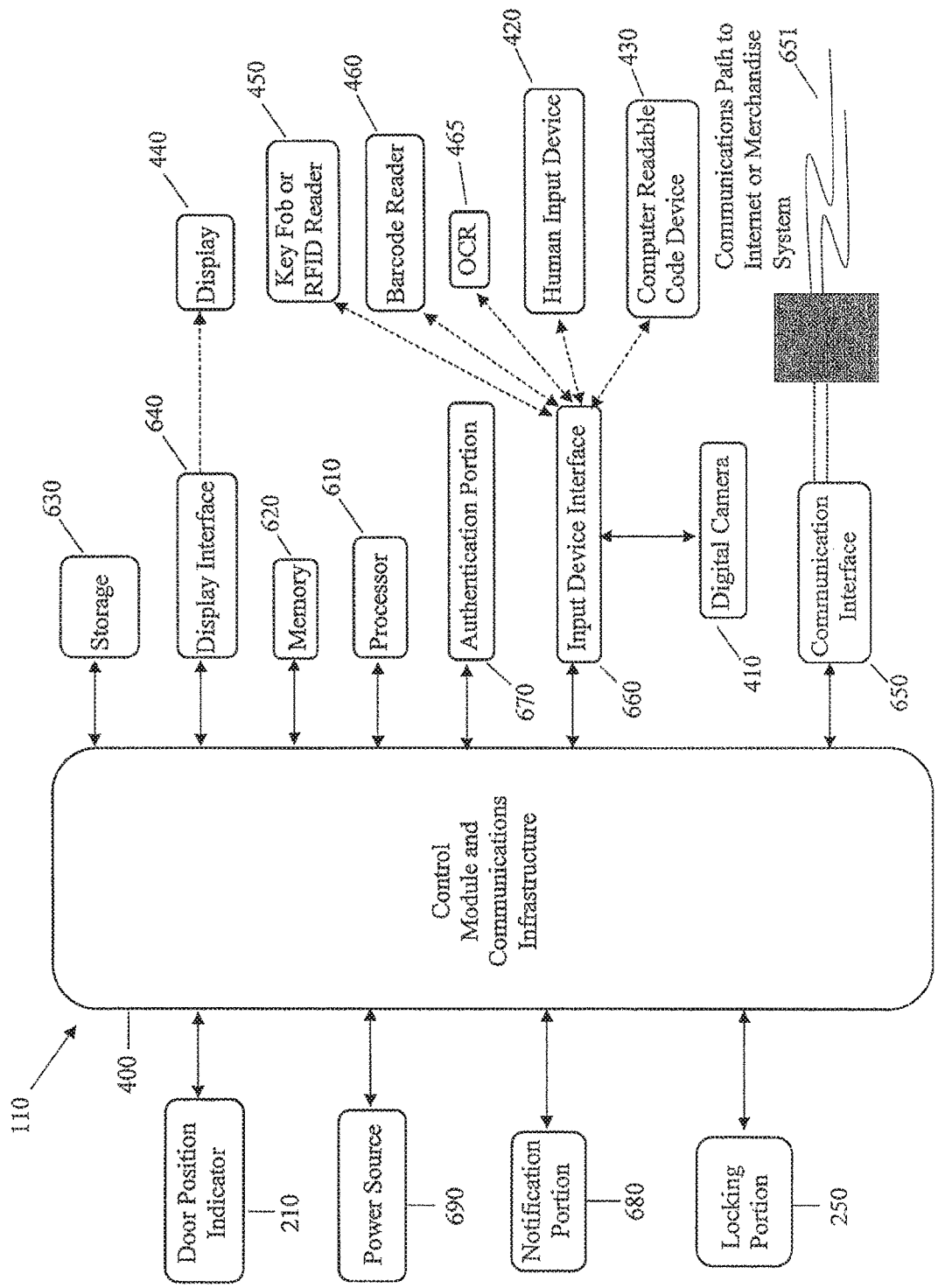
FIG. 4 illustrates an example of the central control unit with a control module.

FIG. 4 illustrates the central control unit 110 and a non-limiting example of the components in a central control unit 110. The central control unit 110 uses a variety of components to control each of the locking portions 250 of the storage lockers 120. The central control unit 110 can include storage lockers 120 in addition to the components described here so that the number of storage lockers 120 employed in the system 100 is maximized. The central control unit 110 shown in FIGS. 1, 3 and 4 does not include storage lockers 120.

The central control unit 110 in FIG. 4 includes a control module 400 having input devices including at least a human input device 420 and a computer readable code device 430, processors 610, memory 620, storage 630, and a display device 440 connected to a display interface 640. The display device 440 can be a touchscreen and therefore operate as an input device. The central control unit 110 may also include a communications portion 650 for connecting to the Internet. The central control unit 110 further includes a storage locker connection portion, which connects the central control unit 110 to at least one storage locker 120. In some embodiments, the connection from the central control unit 110 to the storage locker 120 can be aggregated through the storage locker module 130. Stated differently, the central control unit 110 can have a single connection to the storage locker module 130 that connects a plurality of storage lockers 120 to the central control unit 110 by way of the storage locker module 130. The different components of the central control unit 110 are connected to each other by way of well-known communications infrastructure 660. The central control unit 110 provides power and commands to each storage locker 120 and can also receive information from each storage locker 120.

The control module 400 of the central control unit 110 shown in FIG. 4 includes a plurality of input devices 410, 420, 430 and can include, for example, a still camera 410, an optical character reader (OCR) 465 a barcode reader 460, and a key fob or RFID reader 450. In one embodiment, the input devices include a first input device that will read the authorization information of a service provider, authorize his use of the system and advise the controller to open the door to locker 125 to provide the service provider access to the second input device. The second input device is portable, and in one embodiment, a hand held portable bar code reader that can read the package identifier 222 and the locker identifier 260. The first input device may also be adapted to read the package identifier 222. Alternatively, the first and second input devices may be combined into one reader. For example, a portable bar code reader 460 may be mounted on the wall of the central control unit in an initially locked condition. The input device, if a bar code reader 460 may initially scan a bar code of an authorized service provider that would allow him to unlock the bar code reader 460 so it becomes portable for further use in scanning package identifiers 222 and locker identifiers 260 remote from the central control unit 110. In one alternative embodiment, the portable input device may also include a screen of available residents or recipients and the service provider can designate the proper recipient for the package from reading the address on the package remote from the central control unit, at or near a designated locker.

In another embodiment, the second input device is the input device carried by the delivery person. Preferably, when the central control unit 110 authenticates the delivery person, his portable input device will communicate with the central control unit to identify the package, the recipient and the locker. This communication can be through close proximity wireless communication, through the internet or other means known in the art.

Other embodiments of the central control unit 110 include biometric sensors, audio sensors, other RFID sensors, proximity sensors, Bluetooth proximity sensors, near-field communication sensors, OCR sensors, and other types of information collecting devices as input devices. Any number of input devices can be employed in a central control unit 110. The central control unit 110 uses these sensors in a variety of ways to collect the desired information from a user, from packages, from lockers, and from the environment and considers this information when making decisions. Input from the door position sensor 212 provides the central control unit 110 information on the state of the door for each locker 120. For example, it can act as an authenticator to verify the status of a delivery person. In addition, the central control unit 110 can use this information to control each of the locking portions 250 of the storage lockers 120 in the package management system 100. The central control unit 110 can, in some embodiments, use aspects of the individual storage lockers 120 when controlling each of the locking portions 250. For example, the central control unit 110 can consider if the locking portion 250 or the door position indicator 210 is providing status information that indicates the locking portion 250 is unlocked or the door is open before transmitting commands.

In some embodiments, the still camera 410 can be a video camera employed to monitor the activities near the package management system 100 even when a user is not interacting with the system 100. Such a configuration is desirable so that security of the package management system 100 and security of the packages contained within the system 100 is ensured.

The central control unit 110 executes locker control software and provides a user interface on the display device 440 by controlling the display interface 640. The display interface 640 can also function as an input portion when the display device 440 is a touchscreen device. For example, the display device 440 or the input device 420 may include a list of eligible service providers and means to allow the delivery person to select the list. When referring to the central control unit 110, aspects can be executed by hardware components purposely built for executing these aspects, and other aspects can be executed by software components of the locker control software being executed on hardware components that perform multiple aspects. The user interface provides information to the user and requests input from the user through the input devices. The central control unit 110 can also provide audile or tactile feedback in response to input. The central control unit 110 can also provide an interface accommodating disabled individuals including an audio interface and a tactile based interface.

Information collected by sensors of the individual storage lockers 120 is transmitted to the central control unit 110 for consideration by the locker control software. In some embodiments, the sensor information is preprocessed by an aspect of the storage locker 120 so that status information is transmitted to the central control unit 110. In some embodiments, other types of information can be considered by the central control unit 110 including information received from external sources over the Internet, and information received from authorized devices wirelessly connected to the central control unit 110. As noted above, the central control unit 110 can, for example, wirelessly communicate with a device in a user's possession for authentication. The central control unit 110 uses the different information from the sensors to determine if an action is necessary. An action can include unlocking a locked storage locker 120, locking an unlocked storage locker 120, transmitting an notification, authenticating a user, responding to user input, scanning a package, updating the status of a storage locker 120, and other tasks needed to respond to sensor inputs as desired.

An action can also include detecting when a period of time has elapsed. For example, the central control unit 110 can provide a notification, like an audible or visual alert, if the door 200 of a storage locker 120 has been opened for a period that is greater than the predetermined period of time. The central control unit 110 can also provide a notification when a user has not interacted with the central control unit 110 for a period that is greater than a predetermined amount of time. For example, an audible alert can be provided to a delivery person if they do not shut the same number of lockers that they have inputted for the number of packages to be delivered to an identified resident within a specified time period.

The central control unit 110 allows for commands from authorized users to invoke actions remotely. For example, the central control unit 110 can receive a command from a central server that all storage lockers 120 controlled by the central control unit 110 are to be opened. In some embodiments, the central control unit 110 will authenticate the request and then execute the command. Some embodiments can authenticate the request and conditionally execute the command. For example, a property management representative can request storage lockers 120 that have been stored for more than two weeks to be unlocked. The central control unit 110 determines which lockers satisfy the criteria and only executes the commands for these storage lockers 120. The central control unit 110 can receive configuration information from authorized users using the input devices or from authorized users over the Internet. Such configuration information can come from a property management interface or a resident interface, to be described later.

The central control unit 110 can include a storage portion 630 that stores the locker control software and other information needed for operating the package management system 100. The storage portion 630 stores sufficient information so that when the package management system 100 loses a connection to a central server 700 over the Internet, the package management system 100 will continue to operate until the connection is restored. If changes to the information in the storage portion 630 occur, these changes are queued for synchronizing with the central server 700 when a connection to the central server 700 is available. In some embodiments, at least a portion of the storage portion 630 can be allocated for storing resident and package information. Some embodiments can also allocate a portion of the storage portion 630 for system usage information and other login information that can be transmitted to the central server 700 when the connection is available. Other types of information can be stored on the storage portion 630 of the package management system 100 to facilitate operation of the system 100 such as valid authentication information, even when a connection to the Internet and the central server 700 is not available.

The resident information stored in the storage portion 630 can be used to match a package being delivered to a particular resident. The resident information stored in the storage portion 630 can also be used to authenticate a user so that at least one storage locker 120 containing the corresponding packages is unlocked so that the user can retrieve the packages. For example, when a service provider arrives to deposit a package, the service provider will match the package to a resident. In one embodiment, the service provider can scan package information to match the package and the package identifier 222, through the central control system 110 and central server 700, associates the package to a resident. Further, when a resident arrives, the resident can present information for authentication, such as an unlock code, through an input device such as the first input device. The resident information stored in the storage portion 630 is then used to determine if the information for authentication constitutes valid authentication information.

The central control unit 110 uses industry standard techniques to connect to the Internet. The central control unit 110 can use either wired or wireless networking technologies to establish the connection to the Internet. The central control unit 110 can operate by being directly connected to the Internet or by being connected to the Internet by way of a firewall.

The central control portion 110 includes an authenticator or authentication portion 670 for identifying and verifying the status of valid users who present valid authentication information. The authenticator or authentication portion 670 compares information collected by the sensors with information from the storage portion 630 to determine whether a particular user is a valid user. The authentication portion 670 is configured to use information contained in the package management system 100 so that external resources available over the Internet are not necessary to operate. The authentication portion 670 can, however, augment its decisions using external resources, when available. The authentication portion 670 can identify residents, authorized service providers, and property management representatives, among others. The authentication portion 670 can record information enumerating the number of login attempts that have succeeded or failed. The authentication portion 670 can cause sensors of the input devices to collect additional information. For example, the authentication portion 670 can cause a digital still camera 410 to record an image to capture the appearance of the individual attempting to authenticate. The authentication portion 670 can use other types of sensors to record the attempt by the individual to authenticate with the central control unit 110.

Some embodiments of the package management system 100 allow authorized individuals to act on behalf of other individuals. For example, an authorized property management representative can authenticate with the package management system 100 and retrieve a package on behalf of a resident or tenant when the resident or tenant is unable to retrieve the package himself or herself.

The authentication portion 670 can employ countermeasures to protect against unauthorized authentication attempts. For example, the authentication portion can incorporate a delay or limit the number of authentication attempts within a period of time. The authentication portion 670 can disable additional attempts to authenticate after a predetermined number of failed authentication attempts. Other countermeasures are known in the art and can be employed but are not specifically enumerated here. The authentication portion can consider certain types of information for authentication such as package specific identifiers, residence specific identifiers, and user-specific identifiers. Package specific identifiers are generated in response to the delivery of a package. Resident specific identifiers are configured by either the property management or an authorized resident so that individuals residing in the residence can access packages delivered to the residence. User-specific identifiers are defined by each individual user and are associated with the individual. In some embodiments, the user-specific identifier is a fixed length series of numbers that is defined by the individual. In other embodiments, the user specific identifier is a biometric identifier that is defined by the individual. In some embodiments, the user-specific identifier is a combination of identifiers. For example, the user specific identifier can require both the user-specified identifier and the biometric identifier.

Some embodiments of the central control unit 110 include a notification portion 680 for transmitting notifications and unlock codes to users. The notification portion 680 can use the connection 651 to the Internet when the type of notification transmitted is facilitated by using the Internet. The notification portion 680 can use other communications networks to transmit the notification. For example, the notification portion 680 can rely on a cellular network connection to transmit an SMS message to the user. The notification portion 680 can rely on other communications techniques using other communications networks such as Wireless Ethernet, ZigBee™, Bluetooth, and similar networks configured for a specific device or application. For example, the central control unit 110 can detect a particular smartphone within proximity of the notification portion 680, and then use the notification portion 680 to transmit to a smartphone when the smartphone is within range of the notification portion 680 to remind the user of the smartphone that a package is available. The notification portion 680 can either directly transmit the notification to the smartphone using a communications network, or the notification portion 680 can use the connection to the Internet to transmit a notification to the smartphone.

In some embodiments, the central control unit 110 can respond in customized manners to particular users. For example after a user successfully authenticates with the central control unit 110, the locker control software can determine, by using the resident information stored in the storage portion 630, that the user requires specific accommodations. In one instance, the user can be identified as being visually disabled and so the locker control software presents a tactile or audible interface so that the user can interact with the package management system 100. In another instance, the user can be identified as requiring a storage locker 120 that is not higher than a particular height so that the user can easily access the stored packages. Some embodiments can also allow for users to specify particular preferences regarding their preferred interactions with the package management system 100. These particular preferences can be optionally required in order to allow for customization regarding the manner in which the package management system 100 accommodates deposits, depending on availability. A user can, for example, specify that the graphical interface use a larger or smaller font so that slight visual impairments can be accommodated. The user can also specify that he or she prefers a storage locker 120 that is of a certain height for ease of access. In these situations, the central control unit 110 will accommodate the user's preferences, when possible. These preferences can, however, be disregarded by the central control unit 110 when the availability of the accommodation for the user's preference is not feasible.

Some embodiments of the central control unit 110 can also track the amount of time a package is stored in a storage locker 120. This is particularly applicable in situations where the package management system 100 is used in a location where the storage lockers 120 are provided as part of a service. For example, in a co-working environment, the property owner can charge tenants for the period of time a package is stored in the storage locker 120. The amount of time a package is stored in a storage locker 120 can also be used to determine if the package has time expired. This occurs when a package has been stored in the storage locker 120 for a period of time that exceeds a predetermined period of time set by the property owner. The property owner can then remove the time expired package from the package management system so that the storage locker 120 is again available for others to use.

Central Server

Figure 5:
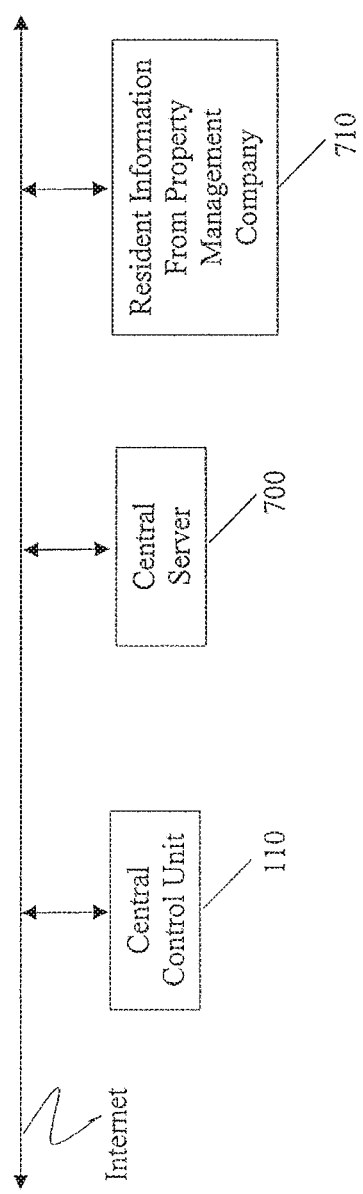
FIG. 5 illustrates a central control unit connected to the Internet, a central server and a property management company.

As outlined in FIG. 5, a central server 700 is provided to manage resident information for at least one package management system 100. In some embodiments, a central server 700 can manage multiple package management systems 100 located in multiple unrelated locations. The central server 700 manages resident information received from the property management companies 710. The central server 700 provides access for property management representatives and residents through a property management interface and a resident interface. These interfaces can be provided as a Web interface or can be provided as an application programming interface (API) against which applications can be programmed to interact with the central server's property management interface and resident interface. The property management interface allows an authenticated property management representative to manipulate resident data. The resident interface allows an authenticated resident to individually manage their resident information through a resident interface.

The central server 700 maintains the master list of resident information for each package management system 100. The central server 700 receives resident information from property management companies 710 including move-ins and move-outs by residents. In some embodiments, resident information from property management companies 710 is periodically retrieved from property management companies 710 by the central server 700. In other embodiments, resident information from property management companies 710 is periodically transmitted to the central server 700. In still further embodiments, changes in resident information are transmitted as they occur from property management companies 710. The central server 700 can use a combination of these and other techniques to obtain information from a plurality of property management companies 710. Updates to the resident information are queued and transmitted to individual package management systems 100 when the next connection is established.

In some instances, changes to resident information can be received from individual package management systems 100. For example, if a resident modifies their information at the package management system 100 by, for example, changing their authentication information, the package management system 100 transmits the modification to the central server 700 the next time the package management system 100 establishes contact with the central server 700. Changes from the individual package management systems 100 are reconciled with the resident information of the central server 700 after the package management systems 100 have transmitted any modifications to the central server 700.

Property Management Interface

The property management interface provides authorized users, including property management representatives, a method for interacting with the resident information stored in the central server 700. The property management interface can be implemented on the central control unit 110 or on the central server 700 that is connected to a package management system 100. When implemented on the central control unit 110, the property management interface can interact with the resident information stored on the central control unit 110. Later, when the central control unit 110 synchronizes data with the central server 700, any changes can be transmitted to the central server 700. When implemented on the central server 700, the property management interface interacts with the resident information of the central server 700. Changes in the resident information of the central server 700 are later transmitted to the appropriate package management system 100. The property management interface, when implemented on a central server 700, can also allow authorized users to remotely control the package management system 100.

A user that accesses the property management interface can be required to provide authentication information so that the user can be identified as a property management representative. For example, a property management representative can modify certain types of data in the central server 700 or in the central control unit 110. In some embodiments, different property management representatives can have different levels of access so that certain modifications of resident information are only available to certain individuals.

In some embodiments, the property management representative can manipulate the data for the units of a property and add, delete, or modify address information, unit information, and other identifying information for the units of the property. For each unit, the property management representative can also edit the residents associated with the unit. For instance, the property management representative can add a dependent such as a resident's spouse to a unit so that the spouse can also access packages that are delivered to the unit, change the name of a resident, change which unit residents are associated with, enable or disable a resident's access to the package management system 100, change the registration status of a resident, or delete a resident from a unit. The property management representative can also associate certain identifying information with a resident. For example, the property management representative can associate a key fob or an RFID tag with the resident so that the resident can access packages by using a key fob or an RFID tag, in conjunction with their user-specific identifier. The property management representative can also modify other aspects of a resident's information including resetting a resident's user-specific identifier and changing an indicator that determines whether the resident requires an accessible locker. Other types of resident information may be modified by the property management representative and are not specifically enumerated here.

Some embodiments allow authorized property management representatives to query the central server 700 for reports on the residents, the billing of residents, and the usage of the package management system 100 at a property. In some embodiments, authorized property management representatives can query the central server 700 for these types of reports across a single property or multiple properties that are managed by the authorized property management representative. The reports can be generated in a variety of standard formats including comma separated values or tab-delimited values so that the information can be further processed. The reports can also be retrieved in a variety of standard document types including Excel spreadsheets, Word documents, or Portable Document Formats, among others.

Resident reports can include reports identifying unregistered residents, registered active residents, deactivated residents, and resident user names, among others. Billing reports can include the registration fees, storage fees, and other associated fees arising from the residents' usage of the package management system 100. Usage reports can include reports identifying the availability of storage lockers 120 in the package management system 100, the packages currently being stored in the package management system 100, errors or faults in the package management system 100, the activities of the storage lockers 120 of the package management system 100, and any overrides of the storage lockers 120 in the package management system 100.

Property management representatives can also modify information that is not specific to a particular resident or unit. For example, property management representatives can modify information associated with a shipping carrier including, for example, the identifier associated with the shipping carrier that authenticates the shipping carrier and authorizes the shipping carrier to deposit packages in the package management system 100. Package management representatives can also add additional carriers, or delete or disable previously entered carriers.

Resident Interface

The resident interface provides authorized users, including residents and dependents, an interface for interacting with some aspects of the resident's information. Like the property management interface, the resident interface can be implemented on the central control unit 110 or on the central server 700 that is connected to a package management system 100. When implemented on the central control unit 110, the resident interface can interact with the resident information stored on the central control unit 110. Later, when the central control unit 110 synchronizes data with the central server 700, any changes can be transmitted to the central server 700. When implemented on the central server 700, the resident interface interacts with the resident information of the central server 700. Changes in the resident information of the central server 700 are later transmitted to the appropriate package management system 100. The property management interface, when implemented on a central server 700, can also allow authorized users to remotely interact with the package management system 100.

The resident interface can be implemented in both locations to allow for the offline modification of resident information even when a connection to the central server 700 is not available or not convenient.

A user that accesses the resident interface can then be required to provide authentication information so that the user can be authenticated and identified by the resident interface. A user can, for example, provide a user name and a user-specified identifier to the resident interface for authentication. Once authenticated, the resident may modify the resident's information including the resident's preferred notification method, the resident's user-specified identifier, and whether the resident requires specific accommodations. In some embodiments, the resident can be optionally be required to accept certain terms and conditions in order for a specific method of notification to be activated.

In some embodiments, a resident can provide information to execute a reset of the user specific identifier. When reset, the central server 700 will send a notification to the resident that provides a temporary user specific identifier for an initial login. The resident will then authenticate using this temporary user specific identifier and then set a new user-specified identifier.

Usage of the Package Management System

Figure 6:
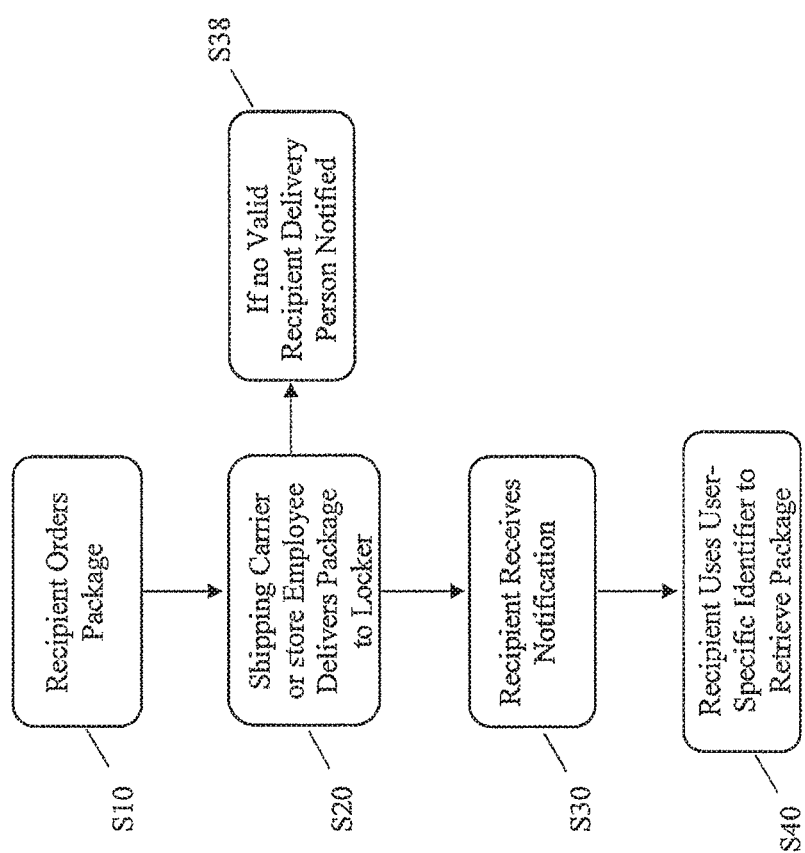
FIG. 6 illustrates steps for using one embodiment of the package management system.
Figure 7:
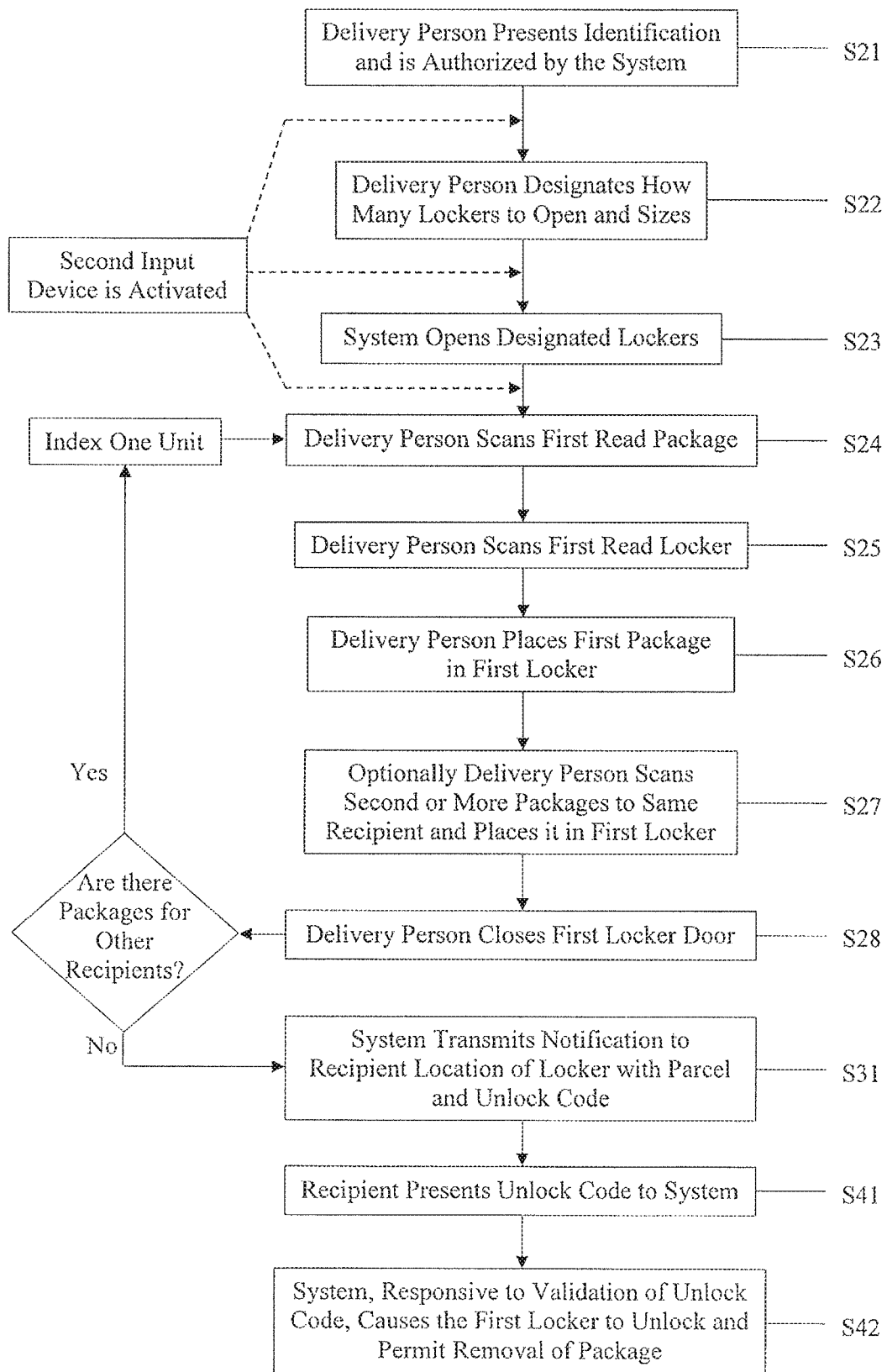
FIG. 7 illustrates steps for when a delivery person deposits a package with one embodiment of the package management system.

Operation of one embodiment of the package management system 100 is now presented. A general overview of the process is depicted in FIG. 6, with detailed steps for the shipping carrier, for the notification of the resident, and for the retrieval of the package in FIG. 7. A resident orders a package (S10) to be delivered to their residence. A shipping carrier delivers the package to the locker (S20).

When a service provider arrives at the package management system 100, the service provider authenticates with the central control unit 110 (S21). The service provider can present a badge, FOB, card with a bar code, RFID, or other identifier for the input devices (420, 430, 450) generally referred to as first input device to scan. The central control unit 110 considers the identifier presented by the service provider and the authentication portion 670 decides if the identifier is valid authentication information for a service provider. In one embodiment, the authentication portion also communicates to the controller to open locker 125 so the service provider has access to the second input device, or portable hand held scanner. Alternatively, a single input device, such as a portable bar code scanner may be lockably mounted on the wall of the central control unit. The service prover presents a bar code or other authorization to the input device to obtain authorization and unlock the input device from its mount and begin the process. In yet another embodiment, once authenticated, the delivery person's handheld scanner can be used as the second input device. The authentication portion 670 can also cause the still camera 410 and other sensors to capture characteristics of the individual who attempted to authenticate as a service provider.

Once the delivery person or service provider is authenticated, the first input device can provide a screen to allow the service provider to indicate how many lockers 120 he wishes to have opened in order to deliver the packages to the residents associated with the system S22. The first input device can also allow the service provider to designate the number of lockers 120 of each size to accommodate the packages to be delivered. In one embodiment, the number of designated lockers should equal the number of packages to be delivered to the system. In another embodiment, where there is human readable information on the package identifier, and the delivery person realizes that a recipient will receive more than one package, the delivery person can designate fewer lockers, so long as there are enough lockers designated so that there is at least one locker for each recipient, and the lockers are of sufficient size to accommodate the packages for each recipient. The controller 400 then opens the designated number of each size of locker S23. At this point, the second input device has been activated, and the delivery person no longer needs to be in close proximity to the central control unit, but can grasp the portable second input device, or in other embodiments use his own input device, and travel to one of the designated lockers to deliver a first package. Alternatively, the second or portable input device may also include a human input portion that allows the delivery person to input the number and sizes of lockers while he is remote from the central control unit 110.

The delivery person preferably uses the second or portable input device to scan the package identifier 222 for the first package that he has for delivery to the system S24. He also scans locker identifier 260 for a designated locker into which the package would fit S25 and places the scanned package into the scanned locker SS26.

At this point, as noted above, if the package identifier has human readable information and the service provider realizes that a recipient will be receiving more than one package in this delivery cycle, he can scan a second package addressed to the recipient and place it in the same scanned locker S27. A plurality of packages can be placed in the scanned locker if the service provider is aware they are all addressed to the same recipient. In one embodiment, the service provider must scan the locker identifier after or before the insertion of a package into a locker. Alternatively, once the locker has been initially identified by the service provider, the central control unit 110 or central server 700 will assume that all subsequent identified packages are placed in the identified locker until that locker door is closed. In any event, when the service provider desires to deposit no more packages into the scanned locker, he closes the door S28.

In one embodiment, as outlined in FIG. 8, the delivery person does not need to scan the locker identifier. Once the delivery person is authorized by the system, S81 and he designates how many lockers are needed to be opened for the amount of packages and recipients, S82, the system opens the designated lockers S83. At some point, the second input device is activated. The service provider or delivery person then scans the first package S84 to be delivered to a recipient and places it in the locker S86. If the recipient is receiving more than one package, the delivery person can scan the second package and place it in the same locker S87. This can be repeated for that designated recipient until the locker is full or there are no further packages for that recipient, at which time, the delivery person closes the door to that locker S28. The central control unit 110 or central server 700 will assume that all identified packages are in the locker for which the door is subsequently closed and will associate those packages with the locker and the recipient. If a second recipient is receiving packages, the delivery person moves to a second open locker and scans and then places the package or packages addressed to the second recipient in the second locker and closes the door to the second locker. Again, the central control unit 110 or central server 700 assumes all packages scanned subsequent to the closing of the first door and prior to closing of the second door to be in the second locker and associates those packages, with the second locker and the second recipient. Since the scanning also provides the central control unit 110 or central server 700 with the identity of the recipient, it can also confirm that all packages in each locker are addressed to the same recipient. If not, an error message can be sent to the delivery person.

Alternatively, if the service provider is unsure as to who the second package is to be delivered, he can scan the package and scan a second locker, place the second package in the second locker and close the door to the second scanned locker. In like manner, he will scan all of the packages to be delivered along with corresponding designated scanned lockers and close all locker doors. It can be appreciated that the delivery person can deliver a plurality of packages without having to access the central control unit after designating the number of lockers. Only after delivering all of the packages for recipients in the system, the service provider returns to the central control unit, places the hand held scanner to the locker 125 and closes its door, or if he is using his personal scanner, holsters the scanner. In either event, he logs out of the system. The central control unit may also comprise an audible or visual warning to ensure that the second or portable input device is returned to the locker or mount before allowing the service provider to log out.

As described earlier, the system then transmits notification to the recipient of the existence of a package in a locker in the system along with an unlock code S31. In a preferred embodiment, the system only notifies the recipient of the existence of the package when the service provider has closed all of the lockers that he requested to be opened. Accordingly, if the recipient received more than one package in this delivery cycle, the recipient only receives one notification. Optionally, this notification can advise the recipient of how many packages are available for pick up.

Later the recipient presents an unlock code to the system S41. Upon validation of the unlock code, the system causes the appropriate locker or lockers with the recipients package or packages to be opened to permit removal of the package or packages S42. When the recipient closes the locker door, the central control unit 110 assumes the locker is empty and available for use by the next delivery person.

It can be appreciated that this system provides an efficient way for the service provider to deliver many packages to multiple recipients assigned to one system, as the service provider does not need to travel from an open locker to the central control unit 110 for each package sent to a particular recipient, but instead can deposit a plurality of packages at one time to a locker or lockers that are remote from the central control unit but, in the case of two or more lockers, near each other, thus saving him time and steps. The service provider can then close each of the doors, or the central control unit can close the doors, which causes the locking portion 250 of each locker 120 to latch and the central control unit is advised of the change of state of the locking portion 250 either by the locking portion or by the change in state of the door position indicator 210.

The central control unit 110 determines which residents have received packages and the number of packages received by each resident, and prepares a series of notifications for transmission by the notification portion 680 to the resident that includes the number of packages received by the resident, see FIG. 9. The central control unit 110 retrieves the appropriate resident information (S32, S33). If no resident information is available, a default set of notifications can be used (S34). The notification portion 680 then transmits the specified notifications to the resident so that the resident is informed that a package or packages have been received (S31). An additional notification can be transmitted to, for example, the property manager, so that the property manager can also be aware that a package or packages have been deposited. The additional notification can optionally include the same information as transmitted to the resident in order to provide privacy for the resident.

A resident arrives at the package management system 100 and presents identification information. For example, the resident can scan an identifier such as a barcode or a key fob, or the resident can use a physical keypad or a touchscreen keypad to enter an identifier (S41). If the identifier corresponds to a resident, the central control unit 110 then presents an inquiry for the resident to enter further information to authenticate (S42). In some embodiments, the inquiry requests the resident enter a user-specified identifier to authenticate. In other embodiments, the inquiry requests the resident provide other information available to the actual resident to authenticate. If the individual authenticates, the central control unit 110 displays a message indicating the appropriate storage lockers 120 have been unlocked (S42). The central control unit 110 also unlocks the locking portions 250 of the appropriate storage lockers 120. In some embodiments, the central control unit 110 can present a screen on the display 440 prompting the user to initiate the unlocking of the locking portions 250. Some embodiments can also allow the resident to configure a preference as to whether the storage lockers 120 are automatically unlocked after authentication or if the storage lockers 120 are unlocked after subsequent input after authentication.

Once the resident has removed the packages, the resident indicates that the process is complete and the user is logged out. The central control unit 110 then returns to a state awaiting further input from an individual.

Modifications

Although the above described package management system has been described, modifications to the system are contemplated by this disclosure. In some embodiments, a nearfield communications device, Bluetooth device, or other wireless device can be used in order to identify a particular user instead of an RFID tag or a key fob.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for delivering two or more packages during a single delivery event in a location with multiple recipients by a delivery person, with each package having a package identifier that includes recipient information, comprising,
a plurality of lockers, each locker having an interior space and a door that when opened allows access to the interior space and a locker identifier,
a locking portion associated with each door for allowing the door to open when in the unlocked state and remain closed when in the locked state,
a central control unit comprising a first input device adapted to verify the status of the delivery person and configured to allow the delivery person to designate the number of lockers to be opened during the delivery event, a second movable input device adapted to read the package identifiers and locker identifiers, and a controller configured to deactivate the locking portions of the designated lockers,
wherein upon authentication of the delivery person and identification of the number of designated lockers by the delivery person at the first input device, the controller deactivates the number of locking portions equal to the number of designated lockers, and
wherein, at a location remote from the first input device, the delivery person uses the second input device to read the package identifier of a first package and a locker identifier for a designated locker and transmits the package and locker information to the central control unit,
and wherein, at a location remote from the first input device, the delivery person uses the second input device to read the package identifier of a second package and a locker identifier for the designated locker and transmits the package and locker information to the central control unit, and
the delivery person places the first and second packages in the interior space of the designated locker and closes the associated door.

2. The system of claim 1 wherein the plurality of lockers comprises lockers of at least two different sizes and wherein the first input device allows the delivery person to also designate the size of lockers to open during the delivery event.

3. The system of claim 1 wherein the second input device is a portable hand held bar code or RFID scanner.

4. The system of claim 3 wherein the second input device is the delivery person's portable hand held bar code or RFID scanner.

5. The system of claim 1 wherein the central control unit also comprises an output device adapted to provide notification to a recipient of the delivery of the first and second packages.

6. The system of claim 5 wherein the central control unit notifies the recipient of the number of packages received for that recipient during the delivery event and provides an authentication to the recipient to subsequently communicate to the controller to deactivate the locking portion of the designated locker in order to retrieve the packages.

7. The system of claim 6 wherein the controller also comprises a recipient identification device that allows the recipient to retrieve the package when activated.

8. The system of claim 6 wherein the first input device and the second input device comprise the same input device.

9. A system for delivering two or more packages during a single delivery event in a location with multiple recipients by a delivery person, with each package having a package identifier that includes recipient information, comprising,
a plurality of lockers, each locker having an interior space and a door that when opened allows access to the interior space,
a locking portion associated with each door for allowing the door to open when in the unlocked state and remain closed when in the locked state and adapted to receive instruction from a central control unit to change from the locked state to the unlocked state and send information to the central control unit when the door is manually closed and the lock is changed to the locked state,
a central control unit comprising a first input device adapted to verify the status of the delivery person and configured to allow the delivery person to designate the number of lockers to be opened during the delivery event, a second movable input device adapted to read the package identifiers, a controller configured to deactivate the locking portions on the designated lockers, and an output device to provide notification to a recipient,
wherein upon authentication of the delivery person and identification of the number of designated lockers by the delivery person, the controller deactivates the number of locking portions equal to the number of designated lockers, and
wherein, the delivery person uses the second input device at a location remote from the first input device to read a first package and places the first package addressed to a first recipient in the interior space of one opened locker and closes the associated door, and
wherein the delivery person uses the second input device at a location remote from the first input device to read a second package addressed to a second recipient and places the second package in the interior space of a second opened locker and closes the associated door, and
wherein the central control unit associates the first package, first locker and first recipient and the output device notifies the first recipient of the delivery of a package, and the central control unit associates the second package, second locker and second recipient and the output device notifies the second recipient of the delivery of a package.

10. The system of claim 9 wherein the second input device is a portable hand held bar code or RFID scanner.

11. The system of claim 10 wherein the second input device is the delivery person's portable hand held bar code scanner.

12. The system of claim 9 wherein the plurality of lockers comprises lockers of at least two different sizes and wherein the first input device allows the delivery person to also designate the size of lockers to open.

13. The system of claim 9 wherein two or more read packages are placed in one designated locker and the central control unit associates the two or more read packages placed in one locker with the locker and the recipient.

14. A system for delivering two or more packages to a single recipient in a location with multiple recipients by a delivery person during a multi-package delivery event, with each package having a package identifier that includes recipient information, comprising, a plurality of lockers, each locker having an interior space and a door that when opened allows access to the interior space, a locking portion associated with each door for allowing the door to open when deactivated and remain locked when the lock is activated by the door being manually closed, a central control unit comprising a data base of recipients, a first input device adapted to verify the status of the delivery person and configured to allow the delivery person to designate the number of lockers to be opened during the delivery event, a second input device adapted to read the package identifier with recipient information for a first recipient, a controller configured to deactivate the locking portions on the designated lockers and store information of when a locker door is closed and the lock is activated, and an output device to provide notification to the recipient, wherein upon authentication of the delivery person and identification of the number of designated lockers by the delivery person, the controller deactivates the number of locking portions equal to the number of designated lockers, and wherein, the second input device reads the package identifier of a first package with recipient information for the first recipient, and the delivery person places the first read package in the interior space of a first locker, and wherein, the second input device reads the package identifier of a second package with recipient information for the first recipient, and the delivery person places the second read package in the interior space of the first locker and closes the associated door thus activating the lock, and wherein the controller advises the central control unit that the door is closed, and the central control unit associates the packages for the first recipient and the first locker, and wherein the output device notifies the first recipient of the delivery of the correct number of packages in the first locker.

15. The system of claim 14 wherein the first and second input devices are the same device.

16. The system of claim 14 wherein the delivery person identifies a second recipient, and wherein, the second input device reads the package identifier of a third package with recipient information for the second recipient, and the delivery person places the third read package in the interior space of a second locker, and wherein, the second input device reads the package identifier of a fourth package with recipient information for the second recipient, and the delivery person places the fourth read package in the interior space of the second locker, and wherein the controller advises the central control unit that the door is closed, and the central control unit associates the packages for the second recipient and the second locker, and wherein the output device notifies the second recipient of the delivery of the correct number of packages in the locker.

* * * * *